Nov. 12, 1940.    I. SHORT    2,221,415

REDUCTION GEARING

Filed Dec. 13, 1938

WITNESSES:

INVENTOR
IRA SHORT.
BY
ATTORNEY

Patented Nov. 12, 1940

2,221,415

UNITED STATES PATENT OFFICE 2,221,415

REDUCTION GEARING

Ira Short, Prospect Park, Pa., assignor to Westinghouse Electric & Manufacturing Company, East Pittsburgh, Pa., a corporation of Pennsylvania Application December 13, 1938, Serial No. 245,487

1 Claim. (Cl. 29—159)

The present invention relates to a fabricated structure comprising metallic parts welded together and including one or more parts composed of an alloy steel requiring, for welding, the application of additional heat in order that a suitable welding temperature may be provided and which parts, when in assembled relation, are subject to heating difficulties, and it has for an object to weld carbon steel ribs on the alloy steel part or parts in positions suitable for the other parts, whereupon the parts are assembled and the ribs are welded to said other parts.

The use of molybdenum steel gear rims has the advantage in reduction gear wheels of providing the desired degrees of hardness; however, where a molybdenum steel part is to be welded to another part, the molybdenum steel must be preheated to a temperature of about 500° F. As the gear of a reduction gear ordinarily has a pair of spaced rows of teeth or a pair of rims together with a web construction or center, preferably having a multiplicity of circumferential zones of attachment with respect to the rims, difficulty is encountered in welding the web construction to the molybdenum steel rims because of the necessary heating of the latter, heating not only being accomplished with difficulty because of interference between the center or web construction, but the presence of heat makes welding in the close spaces of the rims and the web construction almost unbearable to the welder. Accordingly, before connecting the web construction to the molybdenum steel rims, I provide the latter with circumferentially-extending low carbon steel ribs or portions which may be readily welded to the rims because of the ease with which the rims themselves may be heated if there is no interference by the web construction. With the low carbon steel ribs or portions welded internally of the rims, such ribs or portions being spaced correspondingly to the peripheries of the web elements of the web construction, the latter may be readily welded to the ribs or portions for the reason that preheating is unnecessary where low carbon steel parts are welded together.

A further object of my invention is to provide a method of constructing a gear including molybdenum steel rims welded to web portions of a web construction wherein the rims have welded thereto circumferentially-extending carbon steel ribs or portions to facilitate welding of the rims to the web portions of the web construction.

These and other objects are effected by my invention as will be apparent from the following description and claim taken in connection with the accompanying drawing, forming a part of this application, in which:

Figure 1:
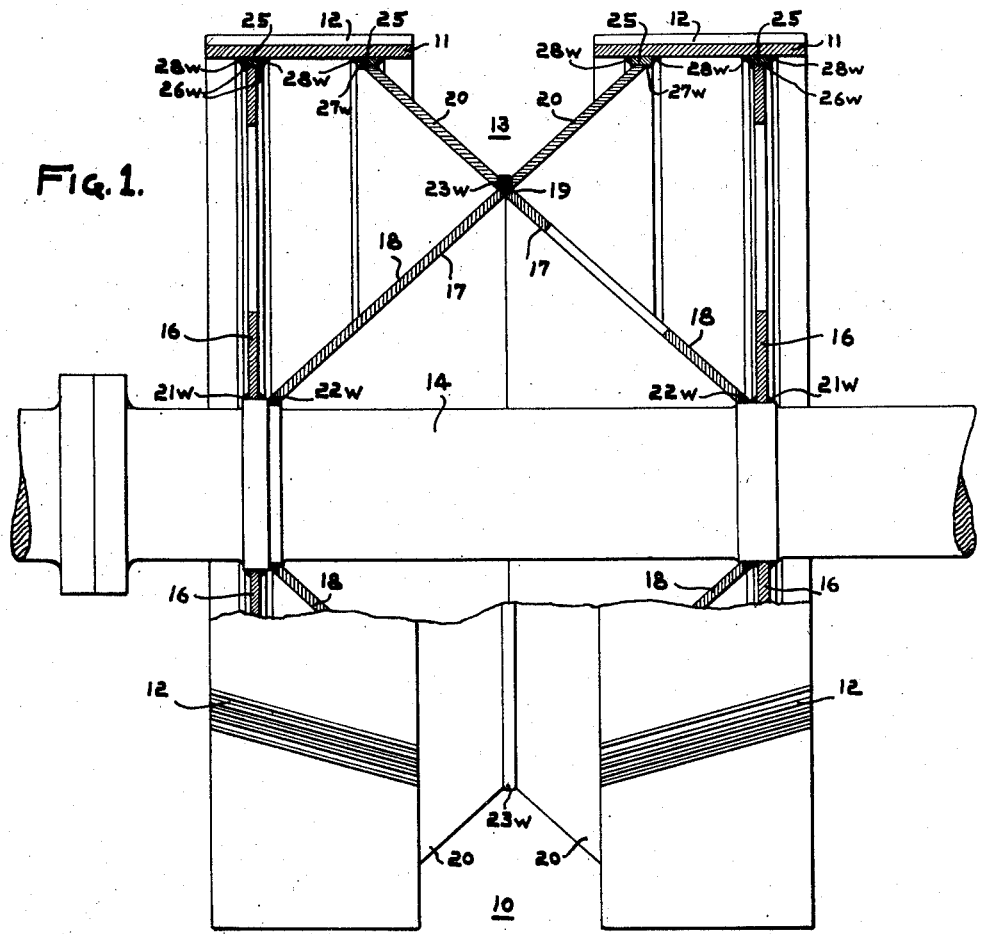
Fig. 1 is a view in section and elevation and showing my improved gear.
Figures 2, 3:
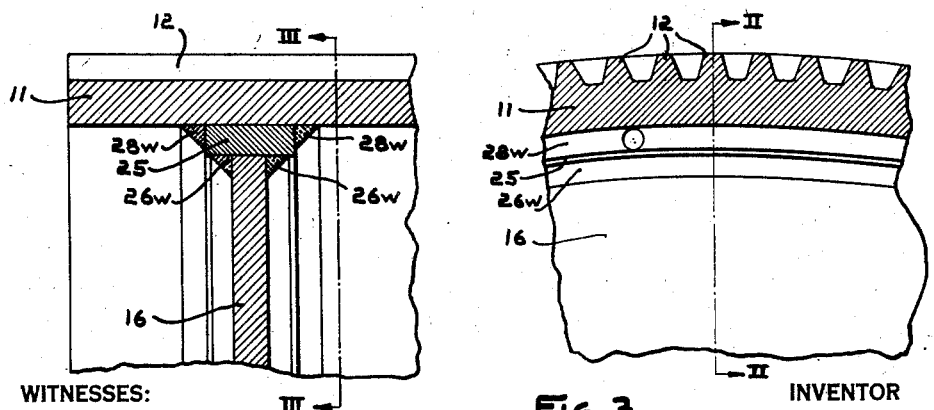
Fig. 2 is an enlarged fragmentary sectional view taken along the line II—II of Fig. 3.
Fig. 3 is a fragmentary sectional view taken along the line III—III of Fig. 2.

In the drawing, there is shown, at 10, a gear member, such as is usually employed in a marine reduction gear, the gear member including a pair of rims 11—11 having rows of helically opposed teeth 12—12 and connected by means of a center or web construction, at 13, to the spindle or hub element 14.

The gear illustrated in Fig. 1 is similar in construction to that disclosed and claimed in my Patent 2,051,498, granted August 18, 1936, and assigned to the Westinghouse Electric & Manufacturing Company, that is, the gear is fabricated for the purpose of securing the desired lightness, strength, and rigidity and in order that the most suitable materials of construction may be used.

Accordingly, in Fig. 1, there is shown a center or web construction, at 13, comprised by outermost radial plates or webs 16—16 and an intermediate arrangement of intersecting conical plates or webs 17—17, the latter preferably being comprised by inner web portions 18—18 which converge inwardly and meet circumferentially at the junction 19 with respect to the outer conical web or plate portions 20—20 diverging outwardly.

With this arrangement, it will be apparent that the outermost webs or plates 16—16 and the outer conical web or plates 20—20 provide web or plate peripheral edges suitably spaced for attachment of gear rims.

The gear center or web construction has the plate elements 16—16 and 17—17 welded, respectively, to the hub or spindle 14 as shown at 21W and 22W. The circumferential junction of the conical web or plate elements 18—18 and 20—20 is preferably constituted by a circumferentially-extending weld 23W, whereby there is provided an intermediate plate or web structure comprised by intersecting conical plates or webs 17—17 joined together by the circumferentially-extending weld 23W at the circumferentially-extending junction or intersection.

The peripheral edges of the web or plate elements 16—16 and 20—20 are welded to the rims 11—11 in the manner to be immediately described.

In accordance with the present invention, the rims 11—11 are made of molybdenum steel to secure the desired hardness; however, the use of molybdenum steel introduces certain difficulties in welding for the reason that it must be preheated before welding is started. In order to provide and to maintain a proper welding temperature, for example, with the molybdenum steel alloy containing a molybdenum of the order of .5%, it is desirable to preheat to a temperature of the order of 500° F. With the construction shown in Fig. 1, it will be apparent that, with the rims 11—11 encompassing the web or plate elements, preheating of the rims and applying heat thereto while welding is taking place would be difficult to accomplish and also would produce a temperature condition almost unbearable to the welder. Accordingly, I provide molybdenum steel gear rims which have interior low carbon steel ribs or portions 25 for welding to the webs or plates 16—16 and 20—20 as shown at 26W and 27W.

The interior circumferentially-extending ribs or portions 25 may be attached to rims 11 in any suitable manner, for example, such ribs or portions are shown as being connected by welds 28W to the interior surfaces of the rims, it being apparent that, with the rims free of any interference, the necessary preheating and heating while welding is occurring may be readily effected and maintained for the purpose of welding the interior ribs or portions 25 thereto. With the molybdenum steel rims provided with carbon steel interior ribs or portions spaced correspondingly to the peripheries of the web or plate elements of the center or web construction, it will be apparent that the rims may be suitably placed relative to the center or web construction, and the circumferentially-extending ribs or portions 25 be welded to the web or plate elements at 26W and 27W, the latter welds necessitating no preheating or maintenance of a high temperature condition during welding as such parts are of suitable carbon steel.

While I have described the invention specifically in connection with rims made of molybdenum steel, it will be apparent that the invention is applicable in any situation where preheating would be required to effect welding and where the structure is such that welding may be accomplished only with discomfort to the welder. Furthermore, while the invention has been described in connection with a gear, it will be apparent that it may be employed in any analogous situation where a similar problem is faced.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In the manufacture of a fabricated metallic structure comprising a rim and spaced webs having their peripheral portions joined thereto by welded connections including welds at the inner sides of the peripheral portions, said rim being composed of an alloy steel requiring preheating to a suitable temperature to render it weldable and said webs being composed of steel which is weldable without preheating and said rim and webs defining an enclosed space providing access for making welds at the inner sides of the peripheral portions of the webs: the method of providing the welded connections without the necessity of welding of the inner surface of the rim from the interior of said enclosed space and with the space-defining portion of the rim preheated to a temperature suitable for welding; said method comprising preheating the rim prior to assembly thereof about the peripheral portions of the webs, and, while it is preheated to a welding temperature, welding steel ribs to the inner surface of the rim to provide a rim aggregate; said ribs being composed of steel which is weldable without preheating and being disposed as a pair of axially-spaced circumferentially-extending arrangements; providing a web aggregate with a pair of webs whose peripheral portions are spaced axially so that when the webs are encompassed by the rim aggregate in assembled relation, the ribs of the latter will be disposed adjacent to the peripheral portions of the webs; assembling the rim aggregate about the webs with the ribs of the former disposed adjacent to the peripheral portions of the latter; and connecting the peripheral portions of the webs to the ribs by welds including welds made from the interior of said enclosed space.

IRA SHORT.